April 23, 1935.  F. J. ANDRÉ ET AL  1,998,429
AIRPLANE LANDING GUIDE
Filed Jan. 10, 1933  2 Sheets-Sheet 1
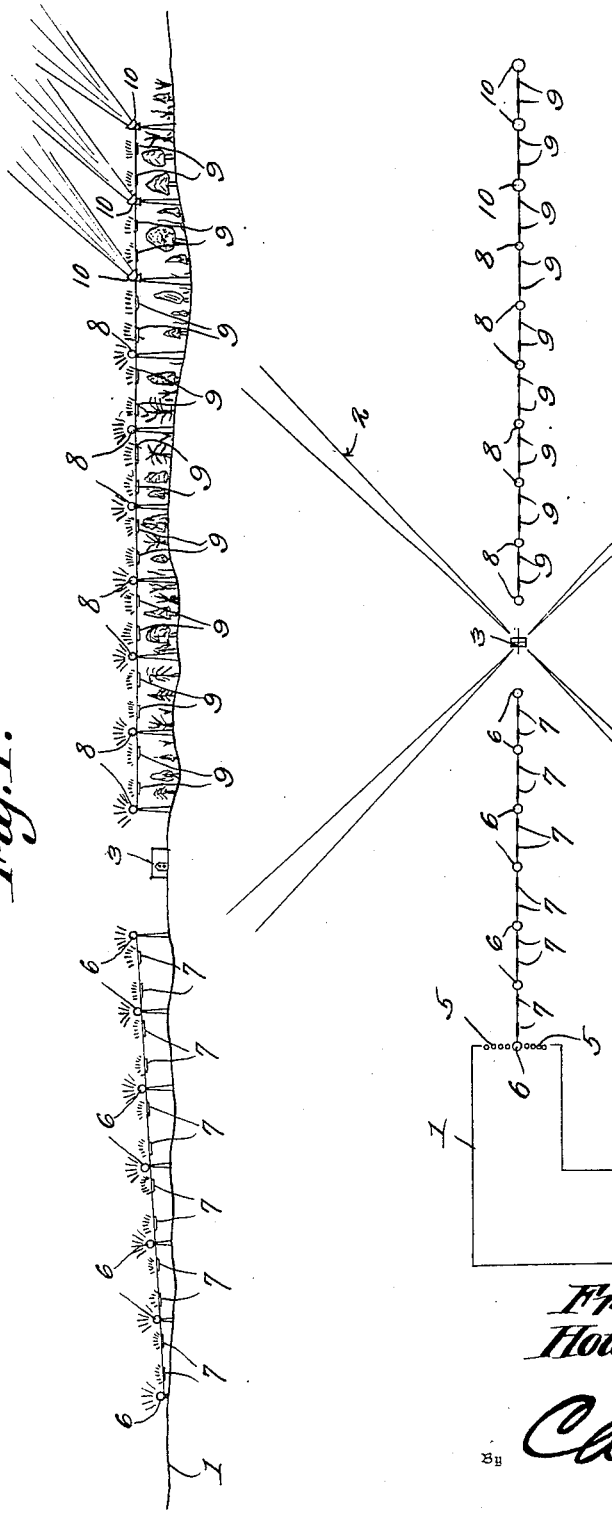
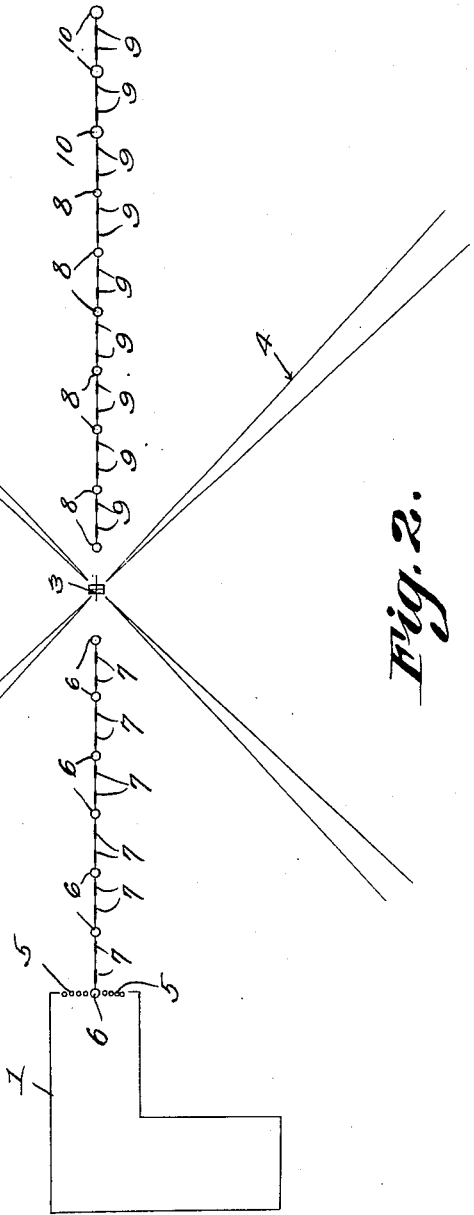
Frank J. André
Howard C. Stark
Inventors,
By C. A. Snow & Co.
Attorneys.

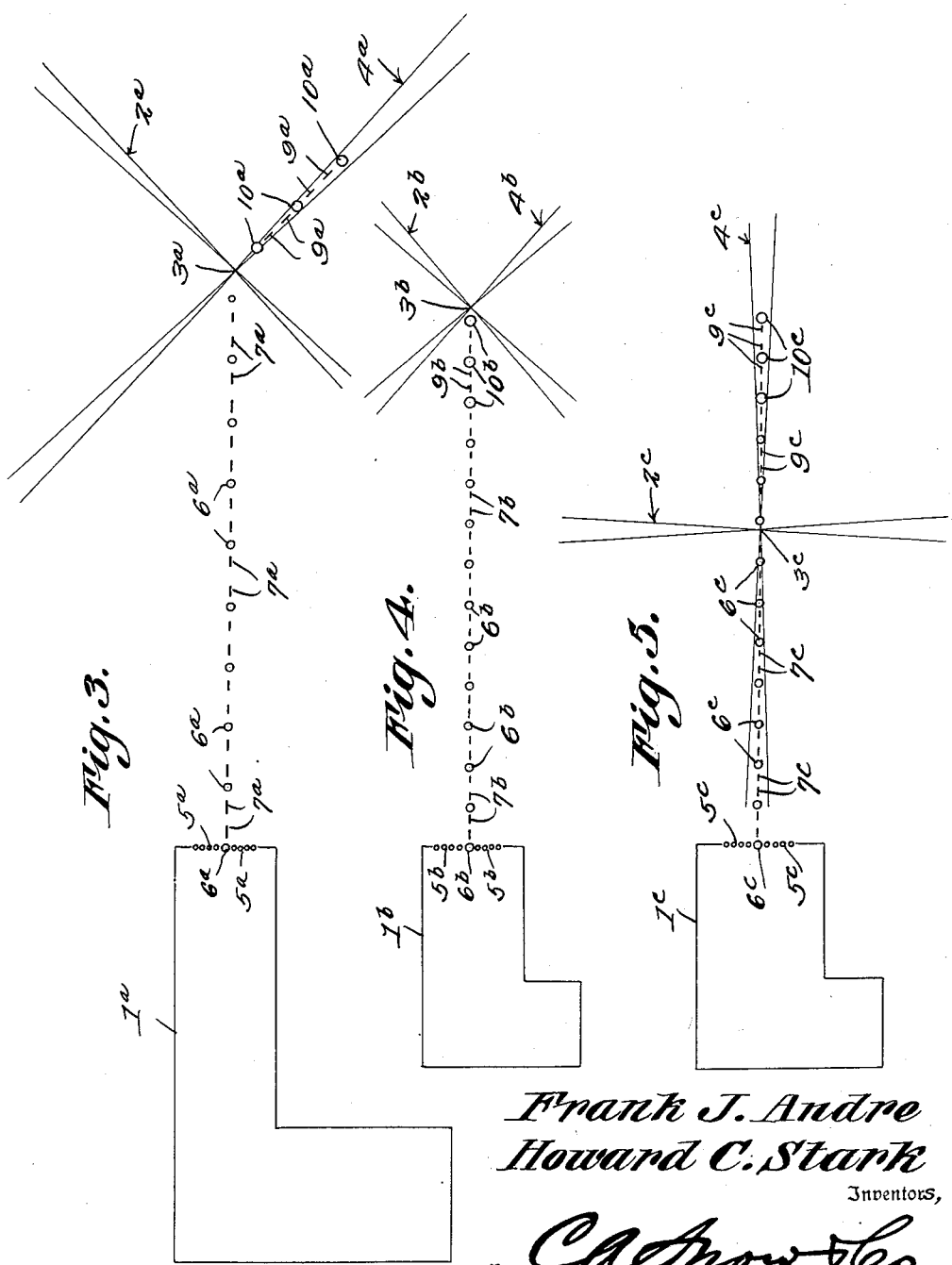

Patented Apr. 23, 1935

1,998,429

UNITED STATES PATENT OFFICE 1,998,429

AIRPLANE LANDING GUIDE

Frank J. André, College Park, Ga., and Howard C. Stark, Poughkeepsie, N. Y.

Application January 10, 1933, Serial No. 651,050

4 Claims. (Cl. 177—352)

The object of this invention is to provide a simple but effective means whereby the pilot of an aircraft, approaching the general locus of a landing field, in a fog, or under like unfavorable conditions as to visibility, and guided by such an instrumentality as the presently-existing Department of Commerce radio beam, may, as he arrives near the sending station from which the beam proceeds, be guided by a novel combination of objects bearing relation to visibility, to the runway of the landing field, information being imparted as to azimuth, altitude, time for checking speed and trimming ship for landing, field boundaries, and the various other factors that make for an accurate, safe and expeditious landing.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:

Fig. 1 shows in elevation, one form of airplane landing guide constructed in accordance with the invention;

Fig. 2 is a top plan;

Figs. 3, 4 and 5 are top plans illustrating modifications.

In Figs. 1 and 2, a landing field is shown at 1, and the sending station from which the beams 2 and 4 proceed is marked by the numeral 3. At the boundary of the field 1 is located a line of lights 5, which may be electric lamps, the term "electric lamps" including neon tubes or anything else that will answer the purpose. This line may be dispensed with, in some instances. The lights 5 may be green neon lamps, elevated three feet or so, to clear snow that may be lying on the ground. The lights 5 may extend along the boundary of the field 1 as far as desired.

In most instances, or except where conditions require another arrangement, the entire system of lights is in the form of a T, the head whereof is the lights 5. Extending from the intermediate portion of the line of lights 5, at right angles thereto in the showing selected as an illustration, is a straight line of lights 6 and 7 prolonged to a point adjacent to the sending station 3. The line of lights 6 and 7 is arranged at a normal gliding angle, as Fig. 1 indicates. It is suggested that the lights 6 be white electric lamps, which may be spaced one hundred feet apart. As to the lights 7 these may be green electric lamps for about one hundred feet from the lights 5, to indicate that it is time to level off for a landing. Then come red electric lamps for the next hundred feet, followed by one green light to indicate that the runway of the field 1 is near. Thence the red lights are continued to the sending station 3. Somewhere along the first line of lights 6 and 7, one of them is rendered individually characteristic, to serve as a special marker, indicating to the pilot that it is time to throttle down, set the stabilizer back and, in general, trim the ship for landing.

Beyond the sending station 3 there is a second line of lights, alined with the first, and extended between the beams 2 and 4. The second line embodies lights 8, 9 and 10. The lamps 8 and 10 may be spaced at intervals of one hundred feet. The lights 8 may be white electric lamps, the lights 10 may be white electric lamps having a defined directional characteristic, and the lamps 9 might be red electric lamps. All of these lamps are carried by towers or poles, or anything else that will raise them above obstacles in the line of flight.

The system shown in Fig. 1 presupposes a very unfavorable chain of circumstances. For instance, the sending station 3 is not far enough from the field 1 so that there is sufficient time to trim for a landing, and therefore the line of lights 8, 9 and 10, extending beyond the sending station 3 is provided. Again, the ship might be off the beams 2 and 4, but in the sector between them. Under such circumstances, the pilot has the advantage of the second line of lights 8, 9 and 10. All of the lights, in either line, color the fog. The lights 10, being of a directional nature, indicate both the line of flight and the general location of the ship, so soon as they are picked up, and from the lights 10, the remaining lights guide the pilot to the runway of the landing field.

In Fig. 3, parts hereinbefore described have been designated by numerals previously used, with the suffix "a". Here, the sending station 3a is far enough from the landing field 1a, so that the line of lights to the right of the sending station 3 in Fig. 1 may be dispensed with, for the most part. The lights 10a, and the interposed lights 9a are retained, and are extended backwardly from the station, along the beam 4a.

In Fig. 4, parts hereinbefore described have been designated by numerals previously used, with the suffix "b". In this form, the sending station 3b is far enough from the field 1b, so that the line of lights to the right of the station 3 in Fig. 1 may be omitted, but at the outer end of the line in Fig. 4, the lights 10b and the interposed lights 9b are employed, the line of lights lying exclusively between the field 1b and the sending station 3b.

Figure 5 presents an ideal condition, in that the beam 4c, and its reverse beam, lead directly to the field 1c and its most available runway. Here the lights 6c and 7c are continued past the station 3c, along the beam 4c, as are the lights 9c and 10c. In Fig. 5, parts hereinbefore described are designated by the numerals previously used, with the suffix "c".

In putting the invention into practice, the pilot, of course, will exercise the skill of his calling, regarding losing altitude, placing his ship on the beam, and other matters relating to sound and approved pilotage, rather than to the specific operation and function of the various mechanisms shown and described.

Acknowledgment is made respecting the well-known Department of Commerce plan of aiding blind landing, described in Research Paper No. 238 of October 1930, and now a matter of common knowledge among experienced flyers. According to the system referred to, a radio landing beam leads from the silent cone of the main long range radio beacon to the landing field. The landing operation, under such a system, is effected by the observing of instruments. The observing of instruments, however, is not a natural way of acquiring knowledge. Skill of an unusual kind is required in making the observations, and after the observations are made, further skill, and skill of a different sort, is required in interpreting the observations made.

The lag of instruments, however well constructed, and their liability to error, is something that has to be taken into consideration. Where the question of pilotage is concerned, no experienced pilot will place implicit confidence on the mechanical perfection of his instruments. As a simple example from an analogous calling, a shipmaster may have the deviation of his compass reduced to a minimum, by a skilled compass-adjuster, yet he will miss no opportunity to try his compass on ranges, the bearing of which is known, nor will he fail to check his compass, by amplitude observations, or some other method, whenever possible. The practice of relying upon something other than the perfection of instruments is so well-known that the foregoing discussion of the matter perhaps has been unduly extended.

Reverting to the specific problem under consideration, a pilot coming in on the main radio beam may miss the silent cone, and be unable to pick up the radio landing beam, in the absence of a skill which is rare, and to be found only with experts, and not, by any means, with all experts.

In the device forming the subject matter of this application, the guiding of a plane from the silent cone of the main radio beams to the runway of the field, does not call for experience in the observation of instruments, or in the interpretation of data derived from instruments. Rather, it depends upon ocular observation of simple conditions external to the ship, and independent of instruments. Stated in plain language, pilots are accustomed to land, governed by what they see about them, external to the ship. This is, and probably long will be, the basis of training for all landings, blind or otherwise. It has a rational foundation, independently of the flying art, and that basis is the natural tendency to draw conclusions from the simplest sort of observed phenomena. For instance, any one can tell by inspection that a surface is curved, unless the curvature is very slight. It requires an entirely different degree of skill, and a different and much more extensive training, to determine by a spherometer that the surface is curved. The advantages in favor of the system shown in this application are no less marked.

According to the training of present day pilots, and in view of the training that pilots will continue to receive, until the flying art is much more perfectly developed than it is at present, pilots look out of the machine, to see what is about them, when a difficult landing is to be made. The time consumed while the eye is shifting from the instrument to objects external to the plane, and back again to the instrument, together with the change of focus in the eye, and the adapting of the eye to light conditions which are different within and without the plane, produce a lost time-period which is of importance, considering the high speed at which the plane is moving. There is, therefore, an obvious advantage in providing a means whereby the pilot, having arrived at the silent cone, may be guided to the margin of the field by a line of lights, which is something that calls neither for instrumental observation nor the interpretation of instrumental readings.

Under present methods, it is necessary for the pilot, upon reaching the silent cone of the directional radio range beam, to retune his receiver to the different wave length of the landing beam, and then to circle while flying (blind) by instruments, in order to pick up this beam and to follow it down to a landing. This circling, when carried out near busy airports located in proximity to factory chimneys, radio towers, etc. always involves a risk of collision with other airplanes, or objects on the ground.

With a line of fog-penetrating lights located along the ground, coincident with the vertical projection of the directional radio range beam and extending from a point along the course to the silent cone and thence to the landing field, there is produced an actual overlap of the radio and visible light systems which would enable the pilot, on approaching the silent cone and when still on a straight course, to change from the instruments in his cockpit over to his natural method of orientation by outside visual reference points. The pilot would then, by outside reference, be enabled to proceed directly along these lights into his actual landing with greater ease, safety and dispatch.

Having thus described the invention, what is claimed is:

1. Means for facilitating the blind landing of aircraft, comprising a landing field, a source of radio beams external to the field but located sufficiently close to the field to be directionally characteristic of the field, and a guiding link between said source and the field and visible to an operator within a plane, said link comprising a line of lights external to the field and leading from said source to the margin of the field.

2. Means for facilitating the blind landing of aircraft, constructed as set forth in claim 1, and wherein a portion of the line of lights serves as a guide for a landing airplane and extends along said one of the radio beams from said source to the margin of the field.

3. Means for facilitating the blind landing of aircraft, constructed as set forth in claim 1, and wherein a portion of the line of lights extends along said one of the radio beams and serves as a course guide for a landing airplane, said line also extending beyond said source, and in a direction away from the field.

4. Means for facilitating the blind landing of aircraft, comprising a landing field, a source of radio energy external to the field but located sufficiently close to the field to be characteristic of the field as a means for guiding a plane to the vicinity of the field, and a guiding link between said source and the field and visible to an operator within a plane, said guiding link comprising a line of lights external to the field and leading from said source to the margin of the field.

FRANK J. ANDRÉ.
HOWARD C. STARK.